(12) United States Patent
Votel

(10) Patent No.: US 7,178,675 B2
(45) Date of Patent: Feb. 20, 2007

(54) DRAIN WATER FILTER ASSEMBLY

(76) Inventor: John C. Votel, 2981 Wimbeldon Dr., Woodbury, MN (US) 55125

( * ) Notice: Subject to any disclaimer, the term of this patent is extended or adjusted under 35 U.S.C. 154(b) by 336 days.

(21) Appl. No.: 10/359,966

(22) Filed: Feb. 6, 2003

(65) Prior Publication Data

US 2003/0146144 A1    Aug. 7, 2003

Related U.S. Application Data

(60) Provisional application No. 60/354,867, filed on Feb. 6, 2002.

(51) Int. Cl.
 *B01D 29/05* (2006.01)
 *B01D 35/28* (2006.01)
 *B01D 35/16* (2006.01)

(52) U.S. Cl. .................. 210/473; 210/232; 210/342; 210/348; 210/455; 210/474; 210/488; 210/498; 210/499; 4/292

(58) Field of Classification Search ............... 210/232, 210/455, 477, 342, 344, 488, 498, 499, 163, 210/164, 348, 464, 465, 469, 473, 474; 4/292, 4/289, 290
See application file for complete search history.

(56) References Cited

U.S. PATENT DOCUMENTS

| 528,688 | A | * | 11/1894 | Payne | ...................... 99/508 |
|---|---|---|---|---|---|
| 2,317,707 | A | * | 4/1943 | Yavitch | ...................... 4/292 |
| 4,042,983 | A | * | 8/1977 | Carpentier | ...................... 4/291 |
| 4,798,307 | A | | 1/1989 | Evrard | |
| 5,974,601 | A | | 11/1999 | Drane et al. | |
| 6,000,094 | A | | 12/1999 | Young | |
| 6,004,461 | A | * | 12/1999 | Harris | ...................... 210/241 |
| 6,006,397 | A | | 12/1999 | Williams et al. | |
| 6,279,195 | B1 | | 8/2001 | Biggs | |
| 6,303,032 | B1 | * | 10/2001 | Genduso | ...................... 210/232 |
| 6,387,261 | B1 | * | 5/2002 | Mojena | ...................... 210/315 |
| 6,562,233 | B1 | * | 5/2003 | Schilling et al. | ............ 210/164 |
| 6,588,029 | B2 | * | 7/2003 | Mullings | ...................... 4/507 |

* cited by examiner

*Primary Examiner*—John Kim
(74) *Attorney, Agent, or Firm*—Anthony G. Eggink; Katrina M. Eggink

(57) ABSTRACT

A drain water filter assembly for filtering debris laden liquids. The filter assembly has an apertured filter holder constructed and arranged to be placed into a basin, tub or sink. A removable and disposable filter is provided for placement within and securement to the filter holder structure. The filter holder has an elevated bottom portion which permits debris to be filtered and the filtered drain water to be dispensed through the apertures in the elevated portions of the filter holder bottom.

19 Claims, 4 Drawing Sheets

DRAIN WATER FILTER ASSEMBLY

This application claims the benefit of U.S. Provisional Patent Application Ser. No. 60/354,867, having the filing date of Feb. 6, 2002.

BACKGROUND OF THE INVENTION

This invention relates generally to a filter assembly. Particularly, this invention relates to a removable filter assembly for filtering drain water. More particularly, this invention relates to a filter assembly which is constructed and arranged for placement in a service basin, tub, sink or the like, and to filter dirt and debris in the used liquid from a mop bucket, for example, as the liquid contents are emptied for disposal.

Drains are often subjected to water laden with dirt and debris. For example, it is common for the contents of a mop bucket to be dumped down the drain for disposal after the mopping and cleaning operation has been completed. Unfortunately, the dirt and debris collected during mopping are likewise dumped down the drain, thereby often eventually causing clogged drain lines. Clogged drains are both inconvenient and costly to the building or business owner. For example, a restaurant may need to severely alter its operations when drains are clogged. Further, costly drain line cleaning services are required and which may add to the disruption of the normal business operation of the enterprise.

Although a need exists in the marketplace for safely and effectively disposing of debris laden liquids such as used mop bucket contents, none insofar as is known has been proposed or developed. The drain water filter assembly provides an effective, economical and versatile assembly to filter debris from waste water.

SUMMARY OF THE INVENTION

The present invention provides an apertured open container constructed and arranged to hold a removable filter and which removes dirt and debris from waste water, such as used liquid mop bucket contents when dumped down a drain.

The invention utilizes a rigid open container, i.e., constructed of molded plastic, which is designed to fit into a service basin, for example. The outer walls of the container may be designed to fit into specified basin structures to thereby secure the container of the invention therein. Importantly, the container has a bottom which is elevated at the center and slopes downwardly to the exterior walls of the container. The elevated, sloping bottom surfaces have apertures arranged therethrough.

A removable filter structure is provided for securement to and within the container. For example, the filter may be of a rectangular liner configuration with an elastic periphery for securement to the outside top periphery of the container. The filter is preferably comprised of a disposable paper filter. The filter conforms over the elevated bottom surfaces of the container. Thus, as the mop bucket contents are dumped into the container, dirt and debris gather in the valleys of the container while fluid filtered by the filter in the container transfers through the apertures in the container bottom walls and through the drain of the service basin, sink, tub or the like.

The filter holder structure having the elevated apertured bottom may also be constructed and arranged to have side walls designed for placement in specified service basin structures. For example, a filter holder structure may be designed for use in several basin or tub designs.

These and other benefits of this invention will become clear from the following description by reference to the drawings.

DESCRIPTION OF THE PREFERRED EMBODIMENTS

Figure 1:
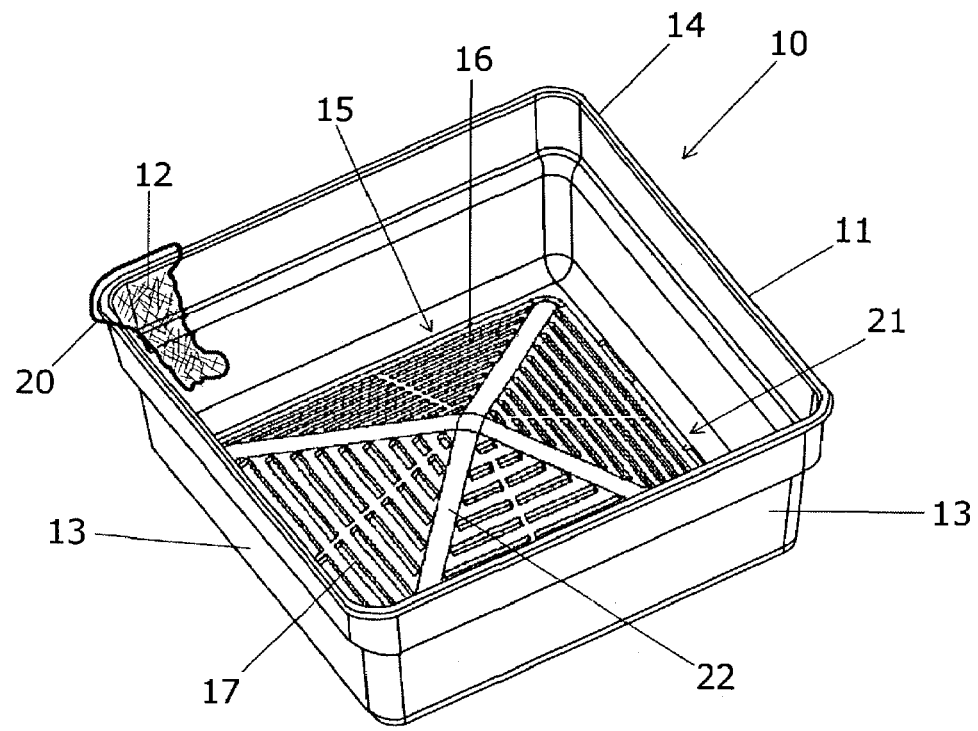
FIG. 1 is a perspective top view of the filter assembly of the present invention.
Figure 2:
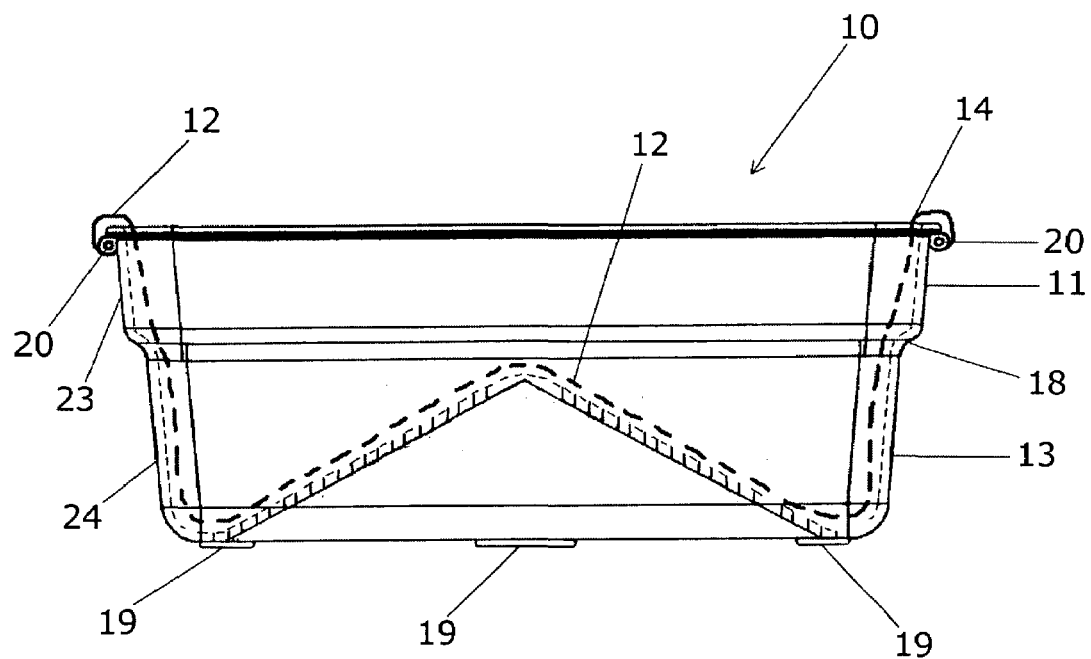
FIG. 2 is a lateral view of the filter assembly of FIG. 1.

Referring to FIGS. 1 and 2, the filter assembly 10 of the invention is shown having a filter holder structure 11 and a flexible filter element 12. The filter holder or liner body structure 11 is preferably molded of a rigid or semi-rigid unitary structure, i.e., molded of a plastic composition. The filter member or element 12 is preferably a disposable paper filter having a peripheral fastener 20, i.e., an elastic member. Alternatively, the filter element 12 may be a reusable woven mesh structure having a mesh count suitable to filter dirt and debris.

The filter holder 11 is further shown to be a generally rectangular structure having side walls 13, a top peripheral edge 14 and an elevated bottom 15. Importantly, the bottom structure 15, arranged like a pyramid for example, is comprised of angled bottom portions 16, each having an arrangement of slotted apertures 17. The elevated bottom portions 16, defined by center ridges 22, angle downward to form a bottom peripheral valley 21.

Figure 5:
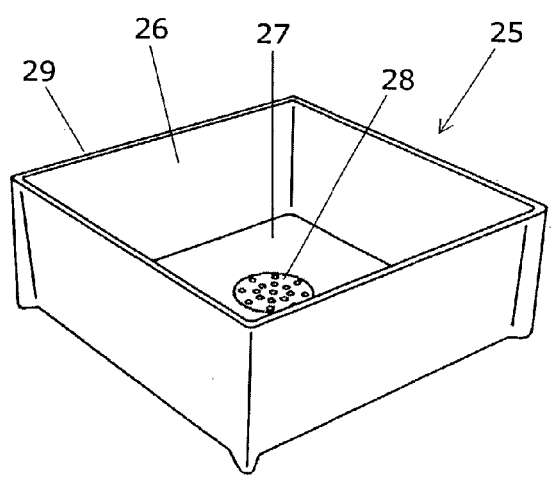

The drain filter assembly of the invention may be used in conjunction with a variety of drain structures. For example, mop service basins constructed of aggregate or molded plastic composites having strainers and drains are known for use to drain mop buckets. The basins may be 24 inch×24 inch×10 inches, for example. The sidewalls of the basins may have flat or curved configurations. As shown in FIG. 5, for example, the service basin 25 may receive filter assembly 10 as indicated by the arrow, whereby the filter holder 11 is inserted within the side walls 26 of the basin 25. The lower wall 24, which provides a smaller bottom area, in comparison to upper wall 23, may be designed to fit into specified basins whereby shoulder 18 may rest on a lower element of the basin.

Figure 3:
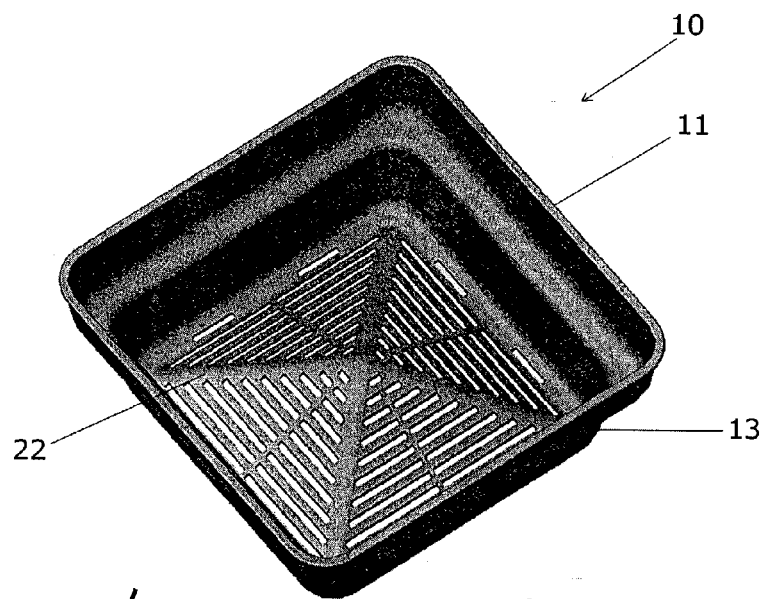
FIG. 3 is a perspective view of the filter assembly being positioned for use to filter a drain.
Figure 4:
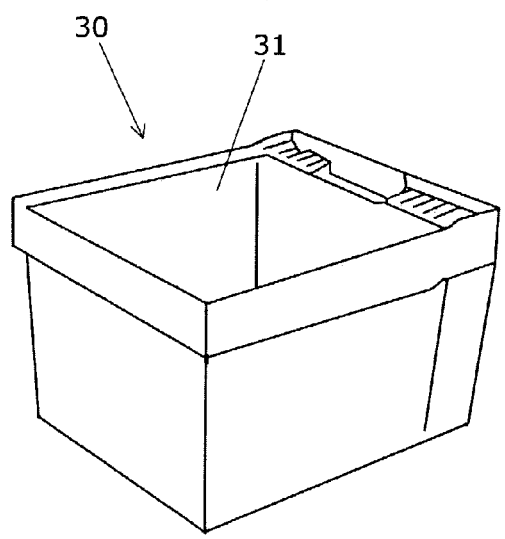
FIGS. 4 and 5, respectively, show a service basin and a tub for which the filter assembly of the assembly may be utilized.

Referring to FIGS. 3 and 4, the filter assembly 10 may also be positioned within the walls of tub or sink 30, which may be floor or wall mounted or free standing. Further, the filter assembly 10 may be used in a variety of such tub or basin designs and may also be free standing.

Referring to FIGS. 3–5, the filter assembly 10 is shown constructed and arranged for positioning within a service basin 25 or a sink or tub structure 30 having walls 31. The service basin 25 is shown to have side walls 26, a bottom 27 with a drain 28 and a top edge 29. For example, the filter holder 11 may be placed within the walls 26 of basin 25 or the shoulder 18 of the filter holder body 11 may rest on the upper top edge 29 of the walls 26 of the basin 25.

Figure 6:
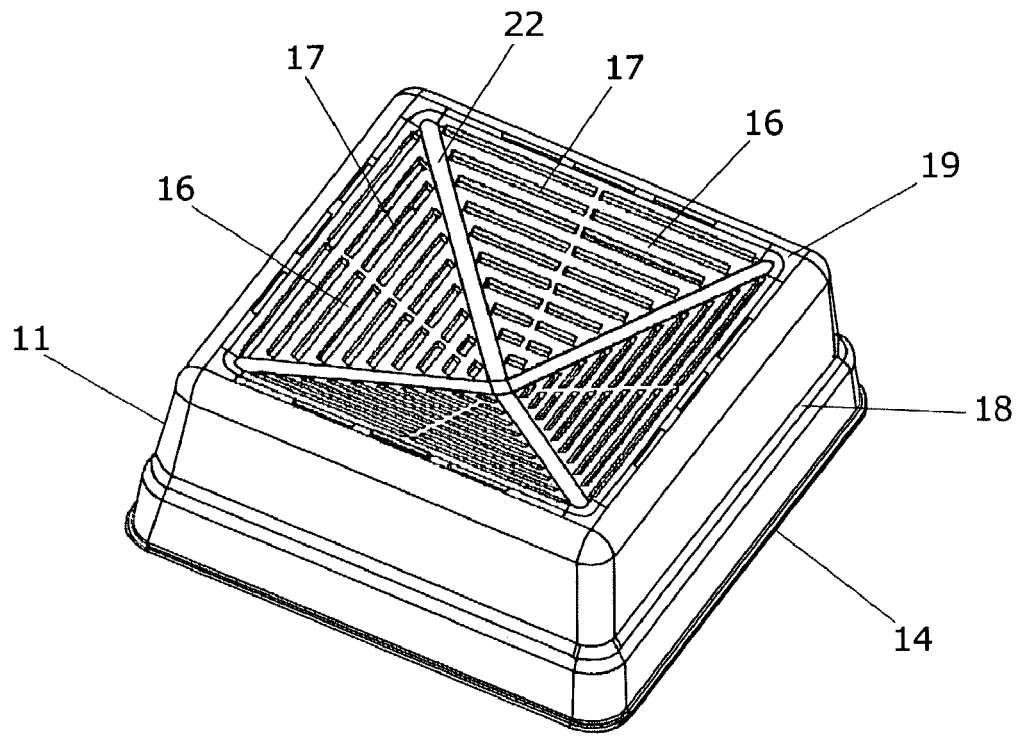
FIG. 6 is a perspective bottom view of the filter assembly of the invention.

FIG. 6 shows the bottom structure of the filter holder 11. Referring further to FIGS. 1 and 3, particularly, the rows of slotted apertures 17 in the angled bottom portions 16 are shown. The apertures 17 are shown spaced in parallel rows in bottom portions 16 between the center ridges 22. Slots or apertures are also shown arranged in bottom peripheral valley 21. Further, support legs 19 are shown arranged about the bottom periphery of the holder structure 11.

Figure 7:
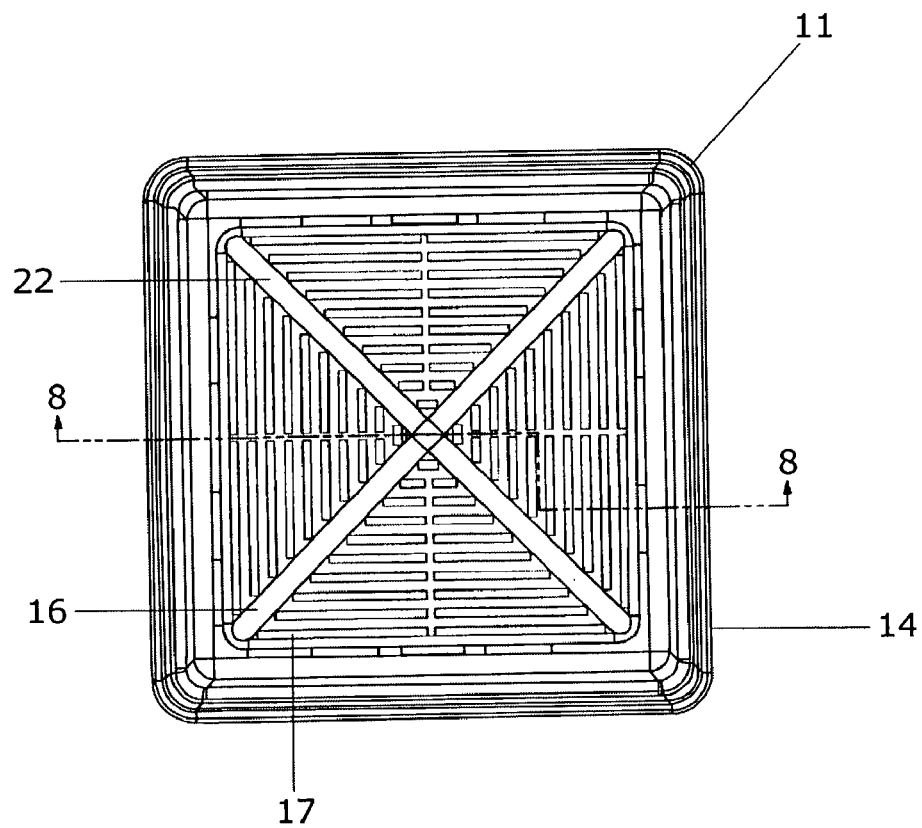
FIG. 7 is a top view of the filter assembly.
Figure 8:
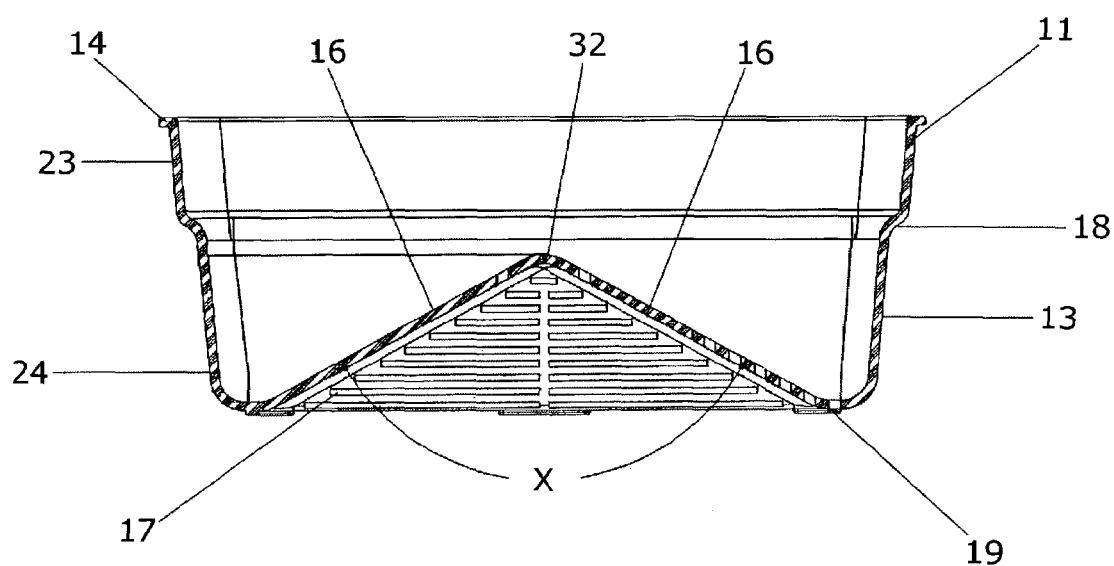
FIG. 8 is a sectional view of the filter assembly taken along line 8—8 of FIG. 7.

FIGS. 7 and 8 further show the filter holder 11. For example, a holder structure having sides approximately 21 inches long along the top, a height of approximately 8.125 inches and a bottom width of approximately 18.10 inches has been found suitable for use in service basins, however, other dimensions and shapes may be utilized to securely fit the filter assembly 10 in a basin, tub, sink or the like. Further, the incline of the elevated bottom portions 16 may be approximately 122.6 degrees as shown by angle "X" and so that the angled bottom portions may have an incline of approximately 30° with respect to the bottom of the holder structure 11. The apex 32 of the elevated bottom portion 15 may be centered and approximately four inches from the bottom of the filter holder wall 13. Alternatively, the downwardly sloped bottom portions may be contiguous and in the form of a dome-like structure or other elevated bottom portion configuration, as opposed to a pyramidal form, as discussed and shown herein.

The filter member 12 is preferably constructed of a disposable filter paper, however, it may be constructed of a synthetic or woven fiber composition, i.e., nylon or the like. The filter member 12 preferably filters out debris the size of sand and larger particles. The filter 12 may have a size of 21×21 inches and be 6 inches deep, for example, and constructed to be used in cooperation with the filter holder 11 discussed above. Although the four sided, generally pyramidal bottom structure is shown, other elevated and perforated bottom designs may be used within the purview of the invention. The filter holder 11 may be rectangular, round or have any other configuration and the filter member 12 is sized to fit the interior of the filter holder 11.

One important aspect of the invention is the elevated bottom portions which are perforated or apertured preferably up to the apex so that dirt and debris will settle downwardly into the valleys of the container and, thus, allowing filtered water to pass through the elevated apertures.

As many changes are possible to the embodiments of this invention utilizing the teachings thereof, the descriptions above and the accompanying drawings should be interpreted in the illustrative and not in the limited sense.

That which is claimed is:

1. A filter assembly for filtering waste water and constructed for use above the drain of basin and sink structures comprising:
    a) a filter body structure constructed and arranged to be free standing and for placement above a drain in a basin or sink structure, wherein said filter body structure is generally rectangular in shape and has side walls having a height, a top peripheral edge, a bottom portion and a generally horizontal peripheral valley separating said side walls and said bottom portion, said bottom portion being comprised of four upwardly angled triangular shaped portions forming a generally pyramidal structure with four center support members, said upwardly angled portions each having a plurality of openings to direct fluid flow and to permit filtered water to pass therethrough; and
    b) a removable filter element for placed over said pyramidal structure and within said filter body structure, said filter element having elastic fastening means to engage said top peripheral edge of said filter body structure.

2. The filter assembly of claim 1, wherein said assembly further includes support leg structures on said bottom portion to thereby elevate said filter body structure, said pyramidal structure terminating at an apex, said apex being elevated from said peripheral valley approximately one half the height of said side wall height.

3. The filter assembly of claim 1, wherein said filter body structure is made of molded plastic, and wherein said peripheral valley has a plurality of apertures therethrough for drainage.

4. The filter assembly of claim 1, wherein said filter body structure is made of a semi-rigid or a rigid material.

5. The filter assembly of claim 1, wherein said filter element is made of a conformable material.

6. The filter assembly of claim 1, wherein said filter element is made of a disposable paper or a woven mesh material.

7. The filter assembly of claim 1, wherein said upwardly angled portions forming said generally pyramidal structure each have an angle of approximately 30 degrees with respect to said generally horizontal peripheral valley.

8. The filter assembly of claim 7, wherein said plurality of openings in said upwardly angled portions comprise a plurality of generally parallel and horizontally aligned elongated slots.

9. A portable drain water filter assembly to filter waste water above a drain comprising:
    a) a filter holder body having a an open top, a bottom member and an enclosed wall extending upward from said bottom member, said bottom member further having a peripheral valley with an upwardly disposed portion, said peripheral valley and said upwardly disposed portion each having a plurality of apertures therethrough;
    b) a removable and conformable filter member having means to secure said filter member to said filter holder body and placed on said bottom member and within said filter holder body; and
    c) said enclosed wall having a generally rectangular cross-sectional structure with four sides and said upwardly disposed portion of said bottom member having a generally four-sided pyramidal configuration.

10. The drain water filter assembly of claim 9, wherein said filter holder body is constructed of a polymeric material.

11. The drain water filter assembly of claim 9, wherein said filter member is constructed of a disposable material.

12. The drain filter assembly of claim 11, wherein said filter member is filter paper.

13. The drain filter assembly of claim 9, wherein said means to secure said filter member is an elastic member.

14. The portable drain water filter assembly of claim 9, wherein said upwardly extending enclosed wall of said filter holder body has a peripheral shoulder portion and a plurality of leg members extending downward from said bottom member.

15. A filter assembly for filtering waste water above a drain and constructed to be freestanding or held within tub, sink and basin structures comprising:

a) a rigid filter body structure constructed and arranged for placement above a drain in a tub, sink and basin structure, wherein said filter body structure is generally rectangular in shape and comprises:
  i) contiguous downwardly and inwardly tapering side walls having an exteriorly extending peripheral shoulder portion for engaging and resting on a tub, sink and basin edge,
  ii) a top peripheral edge,
  iii) a bottom portion having an upper surface and a bottom surface and being comprised of four upwardly angled portions coming together to form a generally pyramidal structure, wherein each said angled portion contains a plurality of generally aligned slotted apertures and wherein said angled portions are angled upwardly with respect to said bottom portion at approximately 30°;
  iv) a plurality of leg members extending from said bottom surface of said bottom portion to thereby elevate said rigid filter body structure above a drain; and
b) a conformable filter element having a top portion and placed over said generally pyramidal structure in said filter body structure, said filter element having elastic fastening means attached at said top portion to engages said top peripheral edge of said filter body structure.

16. The filter assembly of claim 15, wherein said rigid filter body structure is made of a polymeric material and wherein said filter element is made of a flexible disposable paper or a woven mesh material.

17. The filter assembly of claim 15, wherein a horizontally disposed peripheral valley is contiguously disposed between said bottom portion and said generally pyramidal structure, said peripheral valley having a plurality of apertures therethrough.

18. The filter assembly of claim 17, wherein said filter body structure is molded of a polymeric material and wherein said conformable filter element is comprised of a disposable filter paper.

19. The filter assembly of claim 17, wherein said filter body structure has four rounded corners, said pyramidal structure of said bottom portion having an apex, said apex having a specified height and being generally aligned with said exteriorly extending peripheral shoulder portion.

* * * * *